(12) United States Patent
Bilski et al.

(10) Patent No.: US 7,645,355 B2
(45) Date of Patent: Jan. 12, 2010

(54) METHOD OF MAKING A MICROSPHERE TRANSFER ADHESIVE

(75) Inventors: Lori A. Bilski, Woodbury, MN (US); Dale O. Bailey, White Bear Lake, MN (US); Mark S. Vogel, Maplewood, MN (US); Frederick J. Gustafson, Bloomington, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 592 days.

(21) Appl. No.: 11/560,920

(22) Filed: Nov. 17, 2006

(65) Prior Publication Data

US 2008/0118693 A1    May 22, 2008

(51) Int. Cl.
*B29C 65/00* (2006.01)
*B32B 37/00* (2006.01)
*B32B 9/00* (2006.01)
*B32B 33/00* (2006.01)
*B32B 5/16* (2006.01)
*B29D 7/00* (2006.01)

(52) U.S. Cl. .................. 156/184; 156/191; 156/235; 156/238; 156/247; 156/289; 156/307.1; 156/307.5; 156/307.7; 428/40.1; 428/41.8; 428/42.3; 428/323; 427/177; 427/207.1; 427/208.4

(58) Field of Classification Search .............. 156/184, 156/191, 230–232, 234, 235, 238, 247, 289, 156/306.9, 307.1, 307.3, 307.5, 307.7, 308.2, 156/320; 428/40.1, 41.8, 42.3, 323; 427/177, 427/189, 207.1, 208, 208.4
See application file for complete search history.

(56) References Cited

U.S. PATENT DOCUMENTS

| | | | |
|---|---|---|---|
| 3,691,140 A | 9/1972 | Silver | |
| 3,857,731 A | 12/1974 | Merrill, Jr. et al. | |
| 4,049,483 A * | 9/1977 | Loder et al. | 156/230 |
| 4,166,152 A | 8/1979 | Baker et al. | |
| 4,335,171 A * | 6/1982 | Zenk | 428/41.4 |
| 4,337,107 A * | 6/1982 | Eshleman | 156/249 |
| 4,495,318 A | 1/1985 | Howard | |
| 4,556,595 A * | 12/1985 | Ochi | 428/143 |

(Continued)

FOREIGN PATENT DOCUMENTS

EP    0 698 070    2/1996

(Continued)

*Primary Examiner*—Philip C Tucker
*Assistant Examiner*—Sing P Chan
(74) *Attorney, Agent, or Firm*—Robert H. Jordan (57) ABSTRACT

A method of making a repositionable transfer adhesive is provided. The method includes the steps of (a) providing a release liner having opposing first and second surfaces, the first surface having a release value of at least 10 grams per inch, as measured according to the Tape Release Test, lower than the second surface; (b) providing an adhesive composition comprising microsphere adhesive and a binder adhesive; (c) coating the adhesive composition on the first surface of the release liner such that the microspheres protrude from the binder adhesive; (d) drying the adhesive composition to yield a microsphere transfer adhesive; (e) winding the release liner such that the microsphere transfer adhesive is wound inwardly and the second surface of the liner contacts the microspheres; and (f) applying pressure to the second surface of the liner.

22 Claims, 3 Drawing Sheets

U.S. PATENT DOCUMENTS

| | | | | |
|---|---|---|---|---|
| 4,623,392 A * | 11/1986 | Ou-Yang | ............... | 106/31.05 |
| 4,759,968 A * | 7/1988 | Janssen | ............... | 428/202 |
| 4,854,995 A * | 8/1989 | Kasper et al. | ............... | 156/243 |
| 4,855,170 A * | 8/1989 | Darvell et al. | ............... | 428/40.2 |
| 4,988,554 A * | 1/1991 | Peterson et al. | ............... | 428/142 |
| 5,045,569 A | 9/1991 | Delgado | | |
| 5,073,457 A | 12/1991 | Blackwell | | |
| 5,194,329 A | 3/1993 | Hsieh et al. | | |
| 5,202,190 A * | 4/1993 | Kantner et al. | ............... | 428/447 |
| 5,215,818 A | 6/1993 | Silver et al. | | |
| 5,264,278 A * | 11/1993 | Mazurek et al. | ............... | 428/317.3 |
| 5,478,880 A * | 12/1995 | Shipston et al. | ............... | 524/527 |
| 5,508,313 A * | 4/1996 | Delgado et al. | ............... | 521/63 |
| 5,514,122 A * | 5/1996 | Morris et al. | ............... | 604/387 |
| 5,540,795 A * | 7/1996 | Franklin et al. | ............... | 156/64 |
| 5,568,866 A * | 10/1996 | Grosskopf et al. | ............... | 206/466 |
| 5,571,617 A | 11/1996 | Cooprider et al. | | |
| 5,587,043 A * | 12/1996 | Hying et al. | ............... | 156/566 |
| 5,587,214 A * | 12/1996 | Mitchell, Jr. | ............... | 428/40.1 |
| 5,605,730 A * | 2/1997 | Treleaven | ............... | 428/40.1 |
| 5,614,310 A * | 3/1997 | Delgado et al. | ............... | 428/316.6 |
| 5,620,775 A * | 4/1997 | LaPerre | ............... | 428/149 |
| 5,632,842 A * | 5/1997 | Oliver et al. | ............... | 156/268 |
| 5,650,215 A * | 7/1997 | Mazurek et al. | ............... | 428/156 |
| 5,658,661 A * | 8/1997 | Mitchell et al. | ............... | 428/352 |
| 5,663,241 A | 9/1997 | Takamatsu et al. | | |
| 5,711,124 A * | 1/1998 | Stough et al. | ............... | 52/417 |
| 5,711,621 A * | 1/1998 | Austin | ............... | 400/120.13 |
| 5,714,237 A | 2/1998 | Cooprider et al. | | |
| 5,718,098 A * | 2/1998 | Grosskopf et al. | ............... | 53/397 |
| 5,738,748 A * | 4/1998 | Mitchell, Jr. | ............... | 156/253 |
| 5,756,625 A | 5/1998 | Crandall et al. | | |
| 5,788,796 A * | 8/1998 | Look et al. | ............... | 156/277 |
| 5,807,623 A * | 9/1998 | Chess | ............... | 428/195.1 |
| 5,824,748 A | 10/1998 | Kesti et al. | | |
| 5,877,252 A | 3/1999 | Tsujimoto et al. | | |
| 5,908,693 A * | 6/1999 | Delgado et al. | ............... | 428/343 |
| 6,017,624 A * | 1/2000 | Delgado et al. | ............... | 428/355 AC |
| 6,059,915 A * | 5/2000 | Lightle et al. | ............... | 156/238 |
| 6,060,157 A * | 5/2000 | LaPerre et al. | ............... | 428/325 |
| 6,124,417 A * | 9/2000 | Su | ............... | 526/318.44 |
| 6,151,055 A * | 11/2000 | Ackley et al. | ............... | 347/215 |
| 6,197,397 B1 * | 3/2001 | Sher et al. | ............... | 428/42.3 |
| 6,201,042 B1 * | 3/2001 | Kaye et al. | ............... | 523/223 |
| 6,287,765 B1 * | 9/2001 | Cubicciotti | ............... | 435/6 |
| 6,296,932 B1 * | 10/2001 | Crandall et al. | ............... | 428/355 AC |
| 6,312,715 B1 * | 11/2001 | Cantor et al. | ............... | 424/448 |
| 6,315,851 B1 * | 11/2001 | Mazurek et al. | ............... | 156/232 |
| RE37,563 E | 2/2002 | Cooprider et al. | | |
| 6,352,766 B1 * | 3/2002 | Crandall et al. | ............... | 428/343 |
| 6,403,185 B1 * | 6/2002 | Neuburger et al. | ............... | 428/40.1 |
| 6,660,120 B2 * | 12/2003 | Neuburger et al. | ............... | 156/230 |
| 6,780,484 B2 * | 8/2004 | Kobe et al. | ............... | 428/40.1 |
| 7,087,280 B2 * | 8/2006 | Neuburger | ............... | 428/40.1 |
| 2002/0016406 A1 * | 2/2002 | Chen et al. | ............... | 524/502 |
| 2002/0102402 A1 * | 8/2002 | Neuburger et al. | ............... | 428/355 RA |
| 2002/0155243 A1 * | 10/2002 | Kobe et al. | ............... | 428/40.1 |
| 2003/0109630 A1 * | 6/2003 | Smith et al. | ............... | 524/533 |
| 2004/0062924 A1 * | 4/2004 | Neuburger | ............... | 428/343 |
| 2006/0036019 A1 * | 2/2006 | Chen et al. | ............... | 524/501 |
| 2006/0263563 A1 * | 11/2006 | Neuburger | ............... | 428/40.1 |
| 2008/0118693 A1 * | 5/2008 | Bilski et al. | ............... | 428/41.8 |

FOREIGN PATENT DOCUMENTS

WO     WO 9302855 A1 *    2/1993

* cited by examiner

METHOD OF MAKING A MICROSPHERE TRANSFER ADHESIVE

FIELD OF INVENTION

The present invention relates to a method of making a microsphere transfer adhesive where an adhesive composition is coated onto a differential release liner. In particular, the present invention relates to a method that yields a transfer adhesive, where once laminated to a target substrate, microspheres present in the transfer adhesive are exposed.

BACKGROUND

There are a variety of adhesive transfer tapes commercially available today. Typically, adhesive transfer tapes are made by coating an adhesive composition on a differential release liner, i.e., a double-sided release liner where both major surfaces of the liner contain a release coating. The adhesive is coated to the side of the liner with the higher release value. After the adhesive composition is dried, the adhesive coated release liner is wound into a roll to yield the transfer adhesive. When unwinding the adhesive transfer tape, the adhesive remains attached to the side of the liner with the higher release value.

In use, the transfer adhesive is unwound and laminated to backings, such as paper, film, and foam. The transfer adhesive has higher adhesion to the backings than to the release liner and thus is transferred from the release liner to the backings. Transfer adhesives provide an advantage in that they can be applied to heat sensitive, moisture sensitive, or solvent sensitive backings. Because of these sensitivities, an adhesive composition cannot be applied directly to such backings having the sensitivities recited. Transfer adhesives can also be applied to backings by converters and laminators who do not have adhesive coating capability.

SUMMARY

Transfer adhesives that include microspheres adhesives present a special challenge as compared to film forming (i.e., non-microsphere containing) adhesives. The film forming adhesives coated on a release liner have essentially the same composition and morphology on the exposed adhesive side as on the contacting adhesive side; i.e., the side touching the liner. Transfer adhesives that have a combination of a microsphere adhesive and a binder adhesive have a distinct morphology such that when coated on a release liner, the adhesive composition is typically oriented such that the microspheres protrude from the binder adhesive. In other words, the binder adhesive tends to accumulate on the surface upon which the adhesive composition has been coated. If a target substrate, such as paper, foam, and the like, was laminated to the transfer adhesive at this stage, the microsphere adhesive, being the more repositionable adhesive as compared to the binder adhesive, contacts the substrate. The resulting product will have the more permanent binder adhesive exposed and upon laminating the product to a display surface, such as a wall, the product will not be as removable or if removable, the binder adhesive may leave residual adhesive on the display surface, both of which are undesirable characteristics. Thus, what is needed is a product that, once laminated to the transfer adhesive, will have the more repositionable microspheres exposed for laminating to the display surface. The present invention provides a method where upon lamination of the transfer adhesive to the target substrate, the microspheres remain exposed.

In one aspect, the present invention pertains to a method of making a repositionable transfer adhesive. The method comprises the steps of (a) providing a release liner having opposing first and second surfaces, the first surface having a release value of at least 10 grams per inch, as measured according to the Tape Release Test, lower than the second surface; (b) providing an adhesive composition comprising a microsphere adhesive and a binder adhesive; (c) coating the adhesive composition on the first surface of the release liner such that the microspheres protrude from the binder adhesive; (d) drying the adhesive composition to yield a microsphere transfer adhesive; (e) winding the release liner such that the microsphere transfer adhesive is wound inwardly and the second surface of the liner contacts the microspheres; and (f) applying pressure to the second surface of the liner.

In another aspect, the method recited in the preceding paragraph further includes the steps of unwinding the wound microsphere transfer adhesive such that the binder of the transfer adhesive is predominantly exposed; and laminating the microsphere transfer adhesive to a first side of a target substrate, with the binder adhesive contacting the first side of the target substrate and the microsphere of the transfer adhesive is exposed.

In yet another aspect, the present invention relates to a repositionable transfer adhesive made by a process comprising the steps of: (a) providing a release liner having opposing first and second surfaces, the first surface having a release value of at least 10 grams per inch, as measured according to the Tape Release Test, lower than the second surface; (b) providing an adhesive composition comprising a microsphere adhesive and a binder adhesive; (c) coating the adhesive composition on the first surface of the release liner such that the microspheres protrude from the binder adhesive; (d) drying the adhesive composition to yield a microsphere transfer adhesive; (e) winding the release liner such that the microsphere transfer adhesive is wound inwardly and the second surface of the liner contacts the microspheres. The winding step is done such that the liner is under tension.

In yet another aspect, the present invention relates to a roll of transfer adhesive comprising: (a) a release liner having opposing first and second surfaces, the first surface having a release value of at least 10 grams per inch, as measured according to the Tape Release Test, lower than the second surface; and (b) an adhesive comprising a microsphere adhesive partially embedded in a binder adhesive such that a majority of the microsphere adhesive contacts the second surface of the liner and a majority of the binder adhesive contacts the first surface of the binder. Upon unwinding the roll, the microsphere adhesive adheres to the second surface of the release liner and the binder adhesive is exposed.

As used in this document,

"microsphere adhesive" generally means an inherently tacky, elastomeric, solvent-dispersible, solvent-insoluble, acrylate copolymer in the form of spheres generally under 200 micrometers in diameter;

"repositionable adhesive" generally means an adhesive that can be applied to and removed from a surface numerous times;

"permanent adhesive" generally means an adhesive that when applied to a surface tends to form a secure bond such that upon removal of an article containing the permanent adhesive, the adhesive will leave a residue on the surface or the product will be destroyed;

"pressure sensitive adhesive" generally means a material that is aggressively and permanently tacky in dry form (i.e., solvent free) at room temperature and firmly adheres to a variety of dissimilar surfaces;

"tack" and "tacky" means generally the ability of a material to adhere to a solid surface when brought into contact under very light pressure, such as hand pressure.

BRIEF DESCRIPTION OF THE DRAWINGS

The invention can be described with reference to the drawings wherein.

These figures are idealized, are not drawn to scale, and are intended only for illustrative purposes.

DETAILED DESCRIPTION

Figure 1:
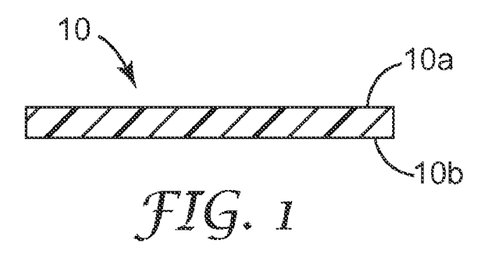
FIG. 1 is a cross-sectional view of an exemplary differential release liner.

FIG. 1 shows an illustrative release liner 10 that can be used in the present invention having a first surface 10a and an opposing second surface 10b. The first surface of the release liner has a lower release value than the second surface, as measured according to a Tape Release Test method described below in the Example section. In one embodiment, the first surface includes a release coating while the second surface does not have a release coating. In another embodiment, the first surface has a release value that is at least 10 grams per inch (g/in) lower than the release value of the second surface. In yet another embodiment, the first surface has a release value that is at least 20 g/in lower than the release value of the second surface, as measured according to the Tape Release Test method. Suitable release coatings that may be used on the first and or the second surface include but are not limited to silicone polymers, fluoropolymers, polyurethanes, polyacrylates, copolymers thereof and combinations thereof.

Figure 2:
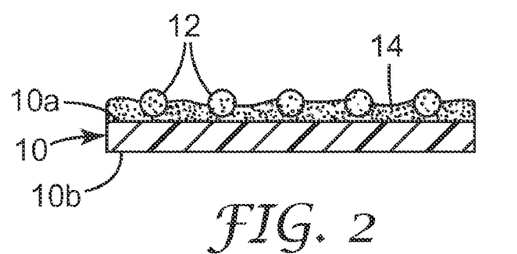
FIG. 2 is a cross-sectional view of the liner of FIG. 1 coated with an adhesive composition.

FIG. 2 shows that an adhesive composition has been applied or coated onto the first surface of the release liner and dried to form the microsphere transfer adhesive 20. The microsphere transfer adhesive includes microsphere adhesives 12 dispersed in a binder adhesive 14. The microspheres protrude from the binder adhesive and a portion is embedded into the binder. The microsphere adhesive can be embedded in the binder adhesive in any amount, as measured according the average diameter of the microsphere, so long as the microsphere adhesive is not completely embedded, i.e., completely covered, by the binder adhesive. In one embodiment, the binder adhesive has a thickness that is about one-half of the average diameter of the microspheres. In some processes, the binder adhesive accumulates on the first surface of the release liner and surrounds the lower hemispherical region of the microspheres such that the microspheres are not in direct contact with the first surface of the release liner. In one embodiment, for a given display surface, the binder exhibits a higher tack value than the microsphere adhesive when the transfer adhesive is adhered to the display surface. In another embodiment, the microsphere adhesive is a repositionable pressure sensitive adhesive and the binder is a permanent pressure sensitive adhesive.

Suitable microsphere repositionable pressure sensitive adhesives includes those disclosed in the following U.S. Pat. No. 3,691,140 (Silver); U.S. Pat. No. 3,857,731 (Merrill et al.); U.S. Pat. No. 4,166,152 (Baker et al.); U.S. Pat. No. 4,495,318 (Howard); U.S. Pat. No. 5,045,569 (Delgado); U.S. Pat. No. 5,073,457 (Blackwell) and U.S. Pat. No. 5,571,617 (Cooprider et al.), U.S. Pat. No. 5,663,241 (Takamatsu et al.); U.S. Pat. No. 5,714,237 (Cooprider et al.); U.S. Pat. No. RE 37,563 (Cooprider et al.); and U.S. Pat. No. 5,756,625 (Crandall et al.) and U.S. Pat. No. 5,824,748 (Kesti et al.). These references are hereby incorporated by reference in their entirety.

The microsphere adhesives are typically blended or dispersed in a binder adhesive. The microsphere adhesive can be a blend of individual microsphere adhesives of different chemical composition or of different size. Likewise, the binder adhesive can be a blend of two or more permanent adhesives of different chemical compositions. The microsphere adhesive and the binder adhesive should be compatible with one another. They can be dispersed in the same solvent or be dispersed in miscible solvents. In one embodiment, the microsphere adhesive is a water based adhesive and the binder adhesive is water based adhesive. In another embodiment, the microsphere adhesive is dispersed in a solvent and the binder adhesive is dispersed in a solvent that is miscible with the microsphere adhesive solvent.

Suitable binders include acrylic pressure sensitive adhesives. Typically acrylic pressure sensitive adhesives are composed of at least one alkyl acrylate monomer and at least one other polymerizable monomer.

The alkyl groups of the alkyl acrylate monomer are linear or branched alkyl radicals having from 4 to about 14 carbon atoms, preferably from 4 to about 10 carbon atoms, and more preferably from 4 to about 8 carbon atoms. Examples of this class of monomers include, but are not limited to, isooctyl acrylate, 4-methyl-2-pentyl acrylate, 2-methylbutyl acrylate, isoamyl acrylate, sec-butyl acrylate, n-butyl acrylate, n-hexyl acrylate, n-octyl acrylate, 2-ethylhexyl acrylate, n-decyl acrylate, isononyl acrylate, isodecyl acrylate, n-lauryl acrylate, and the like, singly or in mixtures.

Suitable other polymerizable monomers are selected from but not limited to alkyl esters of acrylic acid, methacrylic acid, styrene, allyl esters of unsaturated monocarboxylic acids, vinyl esters, vinyl ethers, vinyl pyrollidones, hydroxyl containing alkyl esters of acrylic and methacrylic acid, dialkyl esters of monoethylenically unsaturated dicarboxylic acids, ethylenically unsaturated monocarboxylic and polycarboxylic acids and the anhydrides or nitriles, acrylamide, and N-substituted acrylamides.

The adhesive composition may include other additives known in the art such as surfactants, viscosity modifiers, co-solvents, defoamers, fillers, neutralizing agents, stabilizers or tackifying agents. The purpose of the additives is to provide a stable coating composition that is coatable onto the release liner.

The adhesive composition can be coated on the release liner using any number of coating methods including, but not limited to notch bar coating, fountain roll coating, curtain coating, die coating, and gravure coating. When the adhesive composition is solventless or a hot-melt, it is typically extruded or cast onto the release liner.

The drying method used depends upon the adhesive composition. In the case where the adhesive composition is water or solvent based, typically drying ovens are used. In the case of a solventless or hot melt adhesive composition, light irradiation, electron beam or other suitable means will be used.

Figure 3:
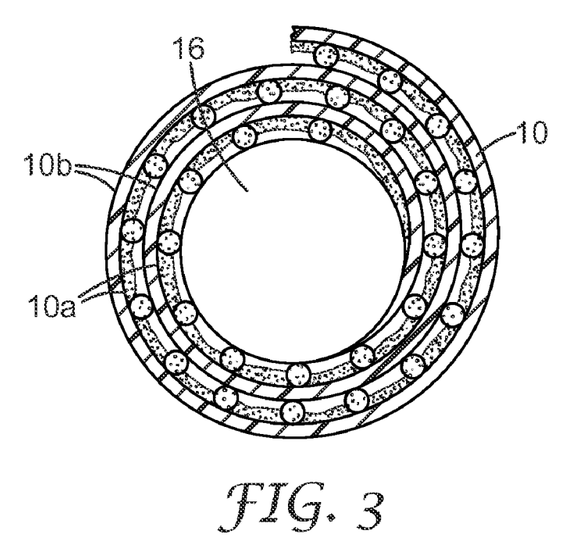
FIG. 3 is a cross-sectional view of the adhesive coated release liner of FIG. 2 wound up in a roll.

FIG. 3 shows the adhesive coated release liner of FIG. 2 wound on a core 16 forming a roll 60. The winding orientation is such that the transfer adhesive is rolled inwardly and is therefore protected by the second surface of the liner. For the first layer of transfer adhesive next to the core, the microsphere adhesive particles, which protrude from the binder, are in direct contact with the core surface. In subsequent layers of the roll, the wind-up is such that the protruding microspheres come into contact with the second surface of the release liner. Pressure can be applied to the transfer adhesive nearly simultaneously with the winding step to cause the microsphere transfer adhesive to transfer from the first to the second surface of the liner. In one exemplary method, the pressure is applied during winding using a pack roll, whose surface may come into direct contact with the second surface of the release liner. Complete transfer of the microsphere transfer adhesive from the first surface to the second surface of the liner may occur quickly, i.e., nearly immediate or within a short duration of hours or may take some time, i.e., within days.

Figure 4:
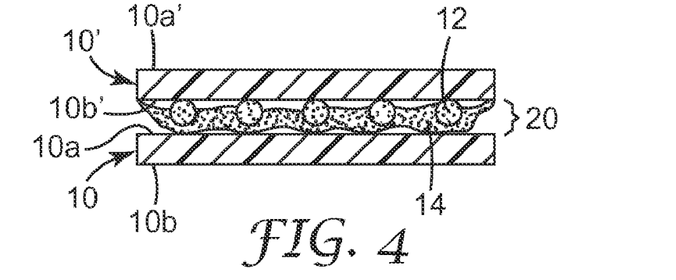
FIG. 4 is a cross-sectional view showing schematically the transfer of the adhesive composition from one surface of the liner to another surface of the liner.

FIG. 4 shows a portion of an adhesive coated release liner 10 that has been wound into a roll. A liner 10' represents the same adhesive coated liner but down-web from the liner 10. For ease of understanding, the transfer adhesive associated with the liner 10' has been omitted. When pressure is applied, typically to liner 10', the transfer adhesive 20 transfers from the first surface 10a of the liner 10 to the second surface 10b' of the liner 10' because the adhesion level between the binder 14 and the first surface 10a is lower than the adhesion between the microsphere adhesive 12 and the second surface 10b' of the liner 10'. During this transfer process, the microsphere adhesive 12 typically comes into contact with the second surface of the down-web liner 10'. Upon unwinding the roll, the transfer adhesive 20 adheres to the second surface 10b' of the liner and the binder 14 is now exposed whereas the microspheres can be described as being somewhat embedded and contacting the second surface of the liner.

Figure 5:
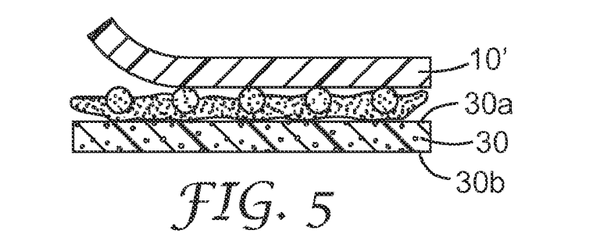
FIG. 5 is a cross-sectional view of the transfer adhesive of FIG. 4 laminated to a target substrate.

FIG. 5 shows the transferred adhesive of FIG. 4 unwound and now laminated to a target substrate 30. Because the binder 14 was exposed (see FIG. 4), it contacts a first side 30a of the target substrate. A particular advantage of the present invention is that the target substrates include those that are bulky, heat sensitive, moisture sensitive, and or solvent sensitive making them unsuitable materials for direct coating of the adhesive composition. Illustrative target substrates include, but are not limited to, foam, paper, polymeric film. Another advantage of the present invention is that the microsphere adhesive transfer tape provides a release liner 10' for a laminated product that further protects the adhesive from contacting any surfaces until the user removes the liner and applies the laminated product to a desired surface. A portion of the release liner 10' has been peeled away.

Figure 6:
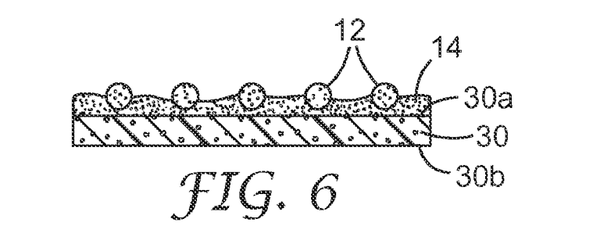
FIG. 6 is one exemplary embodiment of a repositionable adhesive article that can be made by the method described in FIGS. 1 to 6.

FIG. 6 shows a view of a tape 60 following the process step described in FIG. 5 with the release liner 10' removed.

Figure 7:
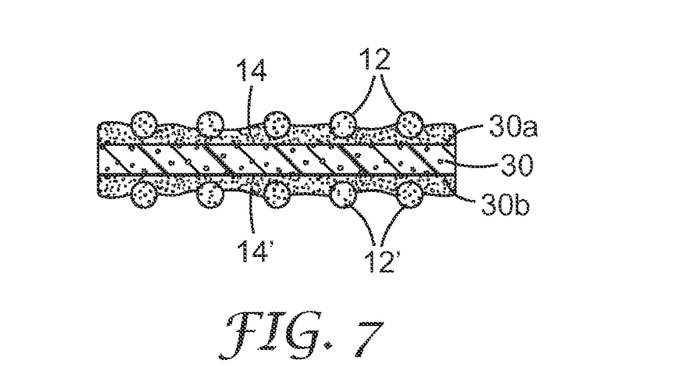
FIG. 7 is another exemplary embodiment of a repositionable adhesive article that can be made by the method described in FIGS. 1 to 6.

FIG. 7 shows a view of a double-sided tape 70 following the process step described in FIG. 5 where the transfer adhesive 20 (FIG. 4) has been laminated to both sides of the substrate 30a and 30b.

Figure 8:
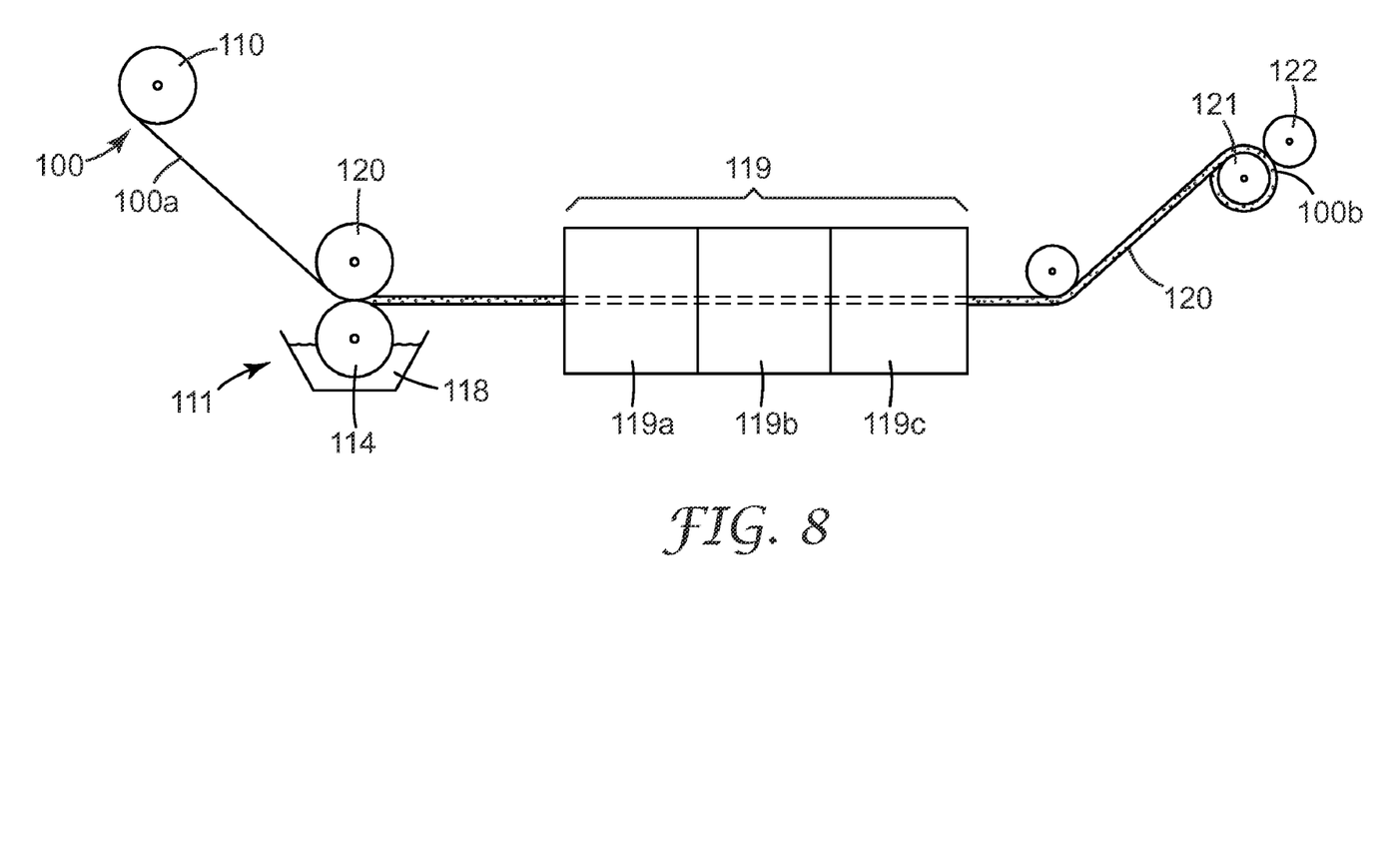
FIG. 8 is a schematic exemplary process of making a microsphere transfer adhesive.

FIG. 8 is a schematic view of an exemplary process of making a microsphere transfer adhesive shown substantially as a continuous process. Dual release liner 100 unwinds from a jumbo 110 such that the liner's first side 100a is exposed. The liner moves to a coating station 111 where equipment coats an adhesive composition to the first side of the release liner. In this particular method, the coating station includes two rolls 112 and 114 forming a nip therebetween. The lower roll 114 is partially immersed in a pan containing an adhesive composition 118. The adhesive coated liner then moves to a drying station 119 drying the adhesive composition to form a microsphere transfer adhesive disposed on the first side of the release liner. In this particular method, three drying ovens 119a, 11b, and 119c are shown. Exiting the drying stations, the liner is wound such that an exposed surface of the transfer adhesive contacts the second side of the release liner. Optionally, a pack roll 122 is used during windup to apply pressure to the transfer adhesive, effectuating the release of the transfer adhesive from the first surface of the liner to the second surface of the liner. Optionally, in subsequent processing steps, various equipment can be used to unwind the adhesive coated liner, which now has the binder exposed, and then laminating the transfer adhesive to a target substrate.

EXAMPLES

Tape Release Test for the Release Liner

To determine the release value of the release liner, a one inch (2.54 cm) wide Scotch® Magic™ tape product number 810, commercially available from 3M Company, St. Paul, Minn., was laminated to one side of the release liner. The 810 tape was rolled down manually in four passes using a 4.5 pound roller at a speed of about 24 inch per minute. The taped liner was aged for 3 days in a constant temperature and humidity room having a relative humidity of about 50% and a temperature of about 73° F. Thereafter, the 810 tape was subjected to an Instron tensile testing machine, where the 810 tape was pulled off the release liner at a 90° angle at a machine pull rate of 12 inches per minute. The average peel force, in terms of grams per inch (g/in), needed to pull the 810 tape from the release liner was recorded. The lower the peel force, the easier the release between the 810 tape and the release liner.

Example 1

A microsphere transfer adhesive of the invention was made as follows.

An adhesive composition was made according to Example 1 of EP 0 698 070 B1. This particular adhesive composition included a blend of microsphere adhesives and an adhesive binder. The adhesive composition had 20% solids dispersed in heptane and isopropanol.

The adhesive composition was coated on a 6 inch wide laboratory coater by notch bar coating. The bar gap above the release liner was set to 4.5 mils. The adhesive was applied to the easy release side of the 3M™ Secondary Liner 4996, commercially available from 3M Company, St. Paul, Minn. This particular liner is a 0.0015 inch polyester film differential release liner with a silicone coating on a first surface (i.e., easy release surface) and a printable coating on an opposing second surface (i.e., tight release surface). The adhesive composition was coated on the easy release side of the liner at a coating speed of 15 feet per minute. The adhesive was dried in three consecutive oven zones set to 165° F., 225° F., and 225° F. After drying, the adhesive coated release liner, now containing a transfer adhesive, was wound into a roll with pressure being applied to an exposed second (tight) surface of the roll by the winding tension of the coater. After one week, the roll was unwound and the transfer adhesive transferred from the first, easy surface to the second, tight surface of the release liner. The release values of the first and second sides of the 4996 liner were measured according to the Tape Release Test and reported at 9.0 g/in and 86.5 g/in respectively, resulting in a differential of 77.5 g/in.

Example 2

A microsphere transfer adhesive was made according to Example 1, except that the differential release liner used was Loparex 7300/7380 Loparex differential release liner, commercially available from Loparex Inc., Willowbrook, Ill. This particular liner is a 0.003 inch polyester film, where both sides are treated with silicone and a first surface has a lower release value (i.e., easy release side) than an opposing second surface of the liner (i.e., tight release side). After one week, the adhesive transferred to the tight side of the liner. The release values of the first and second surfaces of the 7300/7380 liner were measured according to the Tape Release Test and reported at 8.9 g/in and 90.5 g/in respectively, resulting in a differential of 90.5 g/in.

Example 3

A microsphere transfer adhesive was made according to Example 1, except that the differential release liner used was Loparex 7300/7360 Loparex differential release liner, commercially available from Loparex Inc., Willowbrook, Ill. This particular liner is a 0.002 inch polyester film, where both sides are treated with silicone and a first surface has a lower release value (i.e., easy release side) than an opposing second surface of the liner (i.e., tight release side). After one week, the majority of the adhesive transferred to the tight side of the liner. The release values of the first and second surfaces of the 7300/7360 liner were measured according to the Tape Release Test and reported at 5.4 g/in and 22.6 g/in respectively, resulting in a differential of 17.2 g/in.

Comparative Example 1

A microsphere transfer adhesive was made according to Example 1, except that the differential release liner used was Loparex 4318A/4000D Loparex differential release liner, commercially available from Loparex Inc., Willowbrook, Ill. This particular liner is an 88 pound poly coated Kraft paper, where both sides are treated with silicone and a first surface has a lower release value (i.e., easy release side) than an opposing second surface of the liner (i.e., tight release side). The adhesive did not transfer to the tight side of the release liner. The release values of the first and second surfaces of the 4318A/4000D liner were measured according to the Tape Release Test and reported at 11.0 g/in and 14.3 g/in respectively, with a differential of 3.3 g/in.

What is claimed is:

1. A method of making a repositionable transfer adhesive comprising the steps of:
   providing a release liner having opposing first and second surfaces, the first surface having a release value of at least 10 grams per inch, as measured according to the Tape Release Test, lower than the second surface;
   providing an adhesive composition comprising a microsphere adhesive and a binder adhesive;
   coating the adhesive composition on the first surface of the release liner such that the microspheres protrude from the binder adhesive;
   drying the adhesive composition to yield a microsphere transfer adhesive;
   winding the release liner such that the microsphere transfer adhesive is wound inwardly and the second surface of the liner contacts the microspheres; and
   applying pressure to the second surface of the liner.

2. The method of claim 1 further comprising the steps of:
   unwinding the wound microsphere transfer adhesive such that the binder of the transfer adhesive is predominantly exposed; and
   laminating the microsphere transfer adhesive to a first side of a target substrate, with the binder adhesive contacting the first side of the target substrate and the microsphere of the transfer adhesive is exposed.

3. The method of claim 2, wherein the target substrate is selected from the group consisting of foam, paper, and polymeric films.

4. The method of claim 2 further comprising the step of converting the target substrate containing the laminated microsphere transfer adhesive to produce an item selected from the group consisting of a sheet, a tab, and a roll of tape.

5. The method of claim 2, wherein the laminating step exposed the target substrate and the microsphere transfer adhesive to heat and pressure.

6. The method of claim 2, wherein the target substrate includes a second side opposing the first side and wherein the method further comprises a second lamination step where a second adhesive is laminated to the second side of the target substrate.

7. The method of claim 6, wherein the second adhesive is selected from the group consisting of a repositionable pressure sensitive adhesive and a permanent pressure sensitive adhesive.

8. The method of claim 1, wherein the microsphere adhesive is a repositionable pressure sensitive adhesive and the binder adhesive is a permanent pressure sensitive adhesive.

9. The method of claim 1, wherein for a given display surface, the binder adhesive exhibits a higher tack value than the microsphere adhesive when the transfer adhesive is adhered to the display surface.

10. The method of claim 1, wherein the binder adhesive has a thickness of about one half of the average diameter of the microsphere adhesive.

11. The method of claim 1, wherein at least one of the microsphere adhesives and the binder adhesives is a polyacrylate derivative.

12. The method of claim 1, wherein in the winding step, the microsphere transfer adhesive liner is wound under tension and in the applying pressure step, the pressure is supplied from a pack roll whose surface is in contact with the second surface of the release liner.

13. The method of claim 1, wherein at least one of the microsphere adhesive and the binder adhesive in the adhesive composition is water based or solvent based.

14. The method of claim 1, wherein the release liner has a chemical coating on the first surface and no release coating on the second surface, wherein the release coating is selected from the group consisting of silicone polymers, fluoropolymers, polyurethanes, polyacrylates, copolymers thereof and combinations thereof.

15. The method of claim 1, wherein the release liner has a release coating on at least one of the first and second surfaces, the release coating selected from the group consisting of silicone polymers, fluoropolymers, polyurethanes, polyacrylates, copolymers thereof and combinations thereof.

16. The method of claim 1, wherein the first surface of the release liner has a release value of at least 20 gram/inch less than the second surface as measured using a Tape Release Test.

17. The method of claim 1, wherein the binder adhesive accumulates at the first surface of the release liner.

18. The method of claim 1 wherein the winding and the applying pressure steps occur nearly simultaneously.

19. The method of claim 1, wherein the microsphere adhesive is a blend of two or more microsphere adhesives.

20. The method of claim 1, wherein the binder adhesive is a blend of two or more permanent pressure sensitive adhesives.

21. A transfer adhesive made by a process comprising the steps of:
- providing a release liner having opposing first and second surfaces, the first surface having a release value of at least 10 grams per inch, as measured according to the Tape Release Test, less than the second surface;
- providing an adhesive composition comprising microsphere adhesive and a binder adhesive;
- coating the adhesive composition on the first surface of the release liner such that the microspheres protrude from the binder adhesive;
- drying the adhesive composition to yield a microsphere transfer adhesive; and
- winding the release liner under tension such that the microsphere transfer adhesive is wound inwardly and the second surface of the liner contacts the microspheres.

22. A roll of transfer adhesive comprising:
- a release liner having opposing first and second surfaces, the first surface having a release value of at least 10 grams per inch, as measured according to the Tape Release Test, less than the second surface; and
- an adhesive comprising microsphere adhesive partially embedded in a binder adhesive such that a majority of the microsphere adhesive contacts the second surface of the liner and a majority of the binder adhesive contacts the first surface of the liner.

* * * * *

UNITED STATES PATENT AND TRADEMARK OFFICE
CERTIFICATE OF CORRECTION

| | | |
|---|---|---|
| PATENT NO. | : 7,645,355 B2 | Page 1 of 1 |
| APPLICATION NO. | : 11/560920 | |
| DATED | : January 12, 2010 | |
| INVENTOR(S) | : Bilski et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 648 days.

Signed and Sealed this

Sixteenth Day of November, 2010

David J. Kappos
*Director of the United States Patent and Trademark Office*